(12) United States Patent
Spiegel et al.

(10) Patent No.: US 6,711,675 B1
(45) Date of Patent: Mar. 23, 2004

(54) PROTECTED BOOT FLOW

(75) Inventors: Christopher J. Spiegel, Carmichael, CA (US); Andrew H. Gafken, Folsom, CA (US); Robert P. Hale, Portland, OR (US); William A. Stevens, Jr., Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/503,046

(22) Filed: Feb. 11, 2000

(51) Int. Cl.[7] .......................................... G06F 15/177
(52) U.S. Cl. ........................................ 713/2; 713/200
(58) Field of Search ................. 713/2, 1, 200, 713/202

(56) References Cited

U.S. PATENT DOCUMENTS

| | | | |
|---|---|---|---|
| 5,022,077 A | * | 6/1991 | Bealkowski et al. ............ 380/4 |
| 5,210,875 A | * | 5/1993 | Bealkowski et al. ............ 713/2 |
| 5,421,006 A | * | 5/1995 | Jablon et al. ................. 714/36 |
| 5,793,943 A | | 8/1998 | Noll |
| 5,802,592 A | | 9/1998 | Chess et al. |
| 5,805,882 A | | 9/1998 | Cooper et al. |
| 6,018,806 A | | 1/2000 | Cortopassi et al. |
| 6,138,239 A | * | 10/2000 | Veil ........................... 713/200 |
| 6,223,284 B1 | * | 4/2001 | Novoa et al. ................. 713/100 |
| 6,408,387 B1 | * | 6/2002 | Wells ............................. 713/1 |
| 6,473,853 B1 | * | 10/2002 | Spiegel et al. .................. 713/1 |
| 6,564,317 B1 | * | 5/2003 | Hale et al. ....................... 713/1 |
| 6,571,347 B1 | * | 5/2003 | Tseng ............................ 714/6 |

FOREIGN PATENT DOCUMENTS

| | | | | |
|---|---|---|---|---|
| EP | 0 149 005 A2 | | 3/1991 | |
| EP | 0419005 A | * | 3/1991 | ........... G06F/9/445 |

OTHER PUBLICATIONS

PCT Notification of Transmittal of The International Search Report or The Declaration for PCT Counterpart Application No. PCT/US01/00467 Containing International Search Report (Feb. 5, 2002).

\* cited by examiner

*Primary Examiner*—Dennis M. Butler
(74) *Attorney, Agent, or Firm*—Blakely, Sokoloff, Taylor & Zafman LLP

(57) ABSTRACT

A protected boot sequence in a computer system. A reset vector directs the system to a boot program including a protected program. This protected program verifies the integrity of the BIOS contents before branching to the BIOS for execution of normal bootstrap functions. The protected program can also lock down various blocks of bootstrap code to prevent them from being changed after a certain point in the boot sequence. The protected boot sequence can proceed in layers, with each layer providing some level of validation or security for succeeding layers.

31 Claims, 3 Drawing Sheets

PROTECTED BOOT FLOW

BACKGROUND OF THE INVENTION

1. Field of the Invention

The invention pertains generally to a boot process in a computer system. More particularly, it pertains to a protected boot process that resists tampering with the boot sequence.

2. Description of the Related Art

Before a computer system can operate, it must have an operating system (OS) in its memory that allows the computer's resources to be reached and controlled by the other software, such as the various application programs. It is desirable to have various types and versions of operating systems loadable into the same computer system hardware. To accomplish this, the computer hardware has a non-volatile, comparatively simple bootstrap program, which initializes various basic functions and then loads more complicated software from a disk. The boot sequence may have multiple levels of load programs, with each successive level loading a more complex, more capable, but also more modifiable program until the OS itself is loaded.

In a conventional system, the boot process is started with a reset function of some kind. This might be a cold start reset (power to the hardware is initially off), a warm start reset (the hardware is already powered up, but in a partially unknown logic state), or one of several other starting conditions. The type of reset affects the particular functions that must be performed in the boot sequence, but generally does not change the overall boot process.

The reset function typically generates a reset interrupt, which vectors the system to a program in non-volatile memory and begins execution from that point. This program is generally a Basic Input-Output System (BIOS) in flash memory. The BIOS enables basic input-output (IO) control, branches into an option ROM to enable the options that are active in that particular system, and then branches back into the BIOS program to complete initialization and load the OS into main memory from a disk. While most of the hardware in such a system is provided by the computer vendor, the BIOS and option ROM are typically provided by third party vendors, so the computer vendor has limited knowledge of, and control over, the specific contents of these items. In addition, both the BIOS and option ROM are typically reprogrammable while in the computer and therefore subject to tampering after the system has been installed. This presents a security issue, since there is no way to tell if the BIOS or option ROM have been tampered with. Widespread concern over sophisticated hackers and computer viruses makes this problem especially worrisome, as the system may be tampered with in unknown and possibly undetectable ways.

Computer vendors want to be able to verify that the bootstrap sequence is the one they want and expect, and that any unauthorized changes that have been made to this sequence are detectable at boot time so the boot sequence can be terminated and the problem investigated.

SUMMARY OF THE INVENTION

The invention includes a method of booting an operating system that includes initiating a reset function, executing a protected program, validating a BIOS program, and executing the BIOS program.

DETAILED DESCRIPTION OF THE INVENTION

Figure 1:
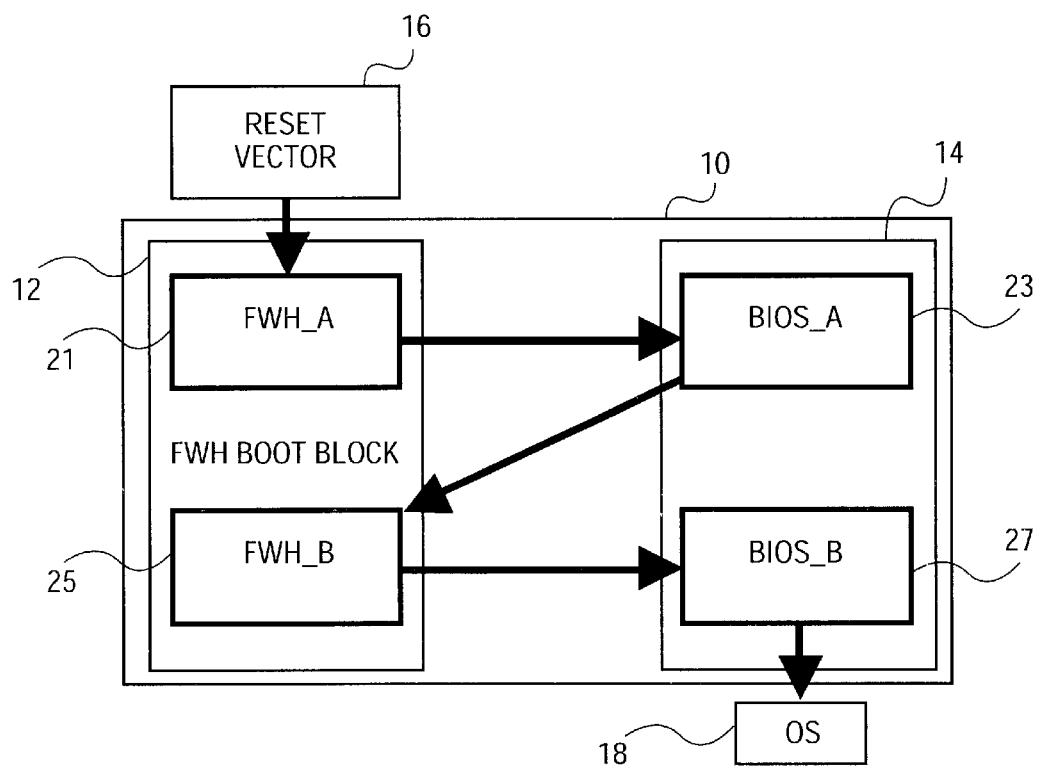
FIG. 1 shows a schematic of a boot sequence.

The invention supplements the conventional boot sequence by introducing one or more groups of protected instructions into the sequence that are protected from tampering themselves, and that verify the integrity of at least a part of the remaining boot sequence. FIG. 1 shows one embodiment of the system. Block 10 encompasses the non-volatile memory containing instructions and data used in the boot sequence. Firmware hub (FWH) 12 is a non-volatile memory block containing instructions (code) that control and validate the boot sequence. BIOS 14 is a non-volatile memory block, which can contain a relatively standard BIOS, but modified to interact with FWH 12.

When the system boots, system reset vector 16 is invoked, which directs the processor to begin execution at a specific address within firmware hub A (FWH_A) in sub-block 21 of FWH 12. The code of FWH_A locates the first sub-block 23 of the BIOS 14, designated BIOS_A. FWH_A 21 then validates the BIOS and FWH_B 25 to make sure it contains the code that is expected. Validation can take a number of forms, depending on the level of security desired. One embodiment performs a checksum of the BIOS code and compares that checksum to the expected checksum stored in FWH_A. Another embodiment uses digital signatures to increase the protection afforded by this security system. FWH_A can include a table identifying the type of security check to be performed, the BIOS objects on which to perform the security check, and the code for performing it.

In addition to validation of the BIOS, code for validating and executing the option ROM can also be included in either FWH 12 or BIOS 14. The option ROM may be included within BIOS 14, or may be in a separate memory block.

After validation of the BIOS, control is passed to the code of BIOS_A, located in sub-block 23 of BIOS 14. BIOS_A code is responsible for initializing main memory and determining the type of the CPU reset. The type of CPU reset that initiated the boot sequence may affect the specific functions that are performed during the boot sequence, but does not change the overall boot process. After performing these functions, control is passed to FWH_B, located in sub-block 25 of FWH 12. FWH_B code is responsible for locking down various blocks of flash memory in FWH 12 and/or BIOS 14.

Lock down is a process of stabilizing a block of code by preventing further write access to that code. This feature is dynamically available in the flash memory typically used for FWH 12. Prior to being locked down by FWH_B, the affected blocks can be updated by the boot code. Subsequent to lockdown, the blocks cannot be further modified without restarting the boot procedure. FWH_B can also load additional security elements into system memory for later use. A limited amount of lockdown may also be performed by FWH_A.

Various blocks of code can be updated before being locked down. This is typically handled by having the updated blocks written into predetermined locations in main memory by the operating system before the system is shut down. When the system is shut down and restarted, the boot program detects these updated modules, validates them, and installs them into the non-volatile memory containing the boot program. After installing these updated modules, they can be locked down to prevent further changes from being made to them. This process permits necessary updates to be made, but protects the boot sequence from unauthorized tampering after a certain point in the boot sequence has been reached.

After completing these tasks, control is passed to the code of BIOS_B contained in BIOS sub-block 27. The BIOS_B code can also have additional security interfaces available for its use as it continues execution of its standard power-on self-test (POST) sequence. BIOS_B can also branch to an option ROM in a conventional manner. BIOS_B contains the OS loader that begins the process that loads operating system 18 into memory. One purpose of the aforementioned validation procedure is to validate the integrity of this OS loader.

Figure 2:
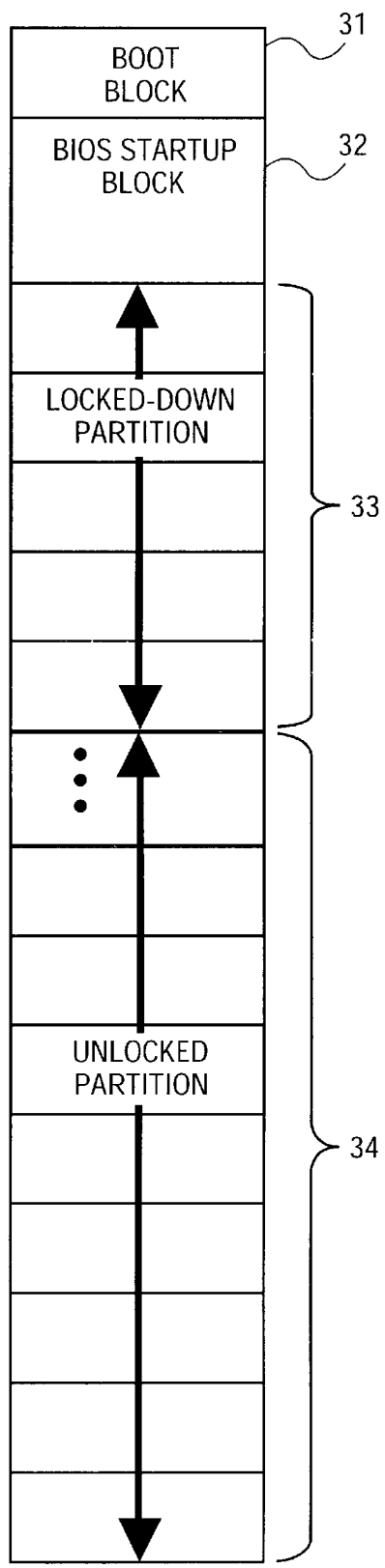
FIG. 2 shows a firmware hub block partitioning scheme.

FIG. 2 shows how the contents of the firmware hub may be allocated. In one embodiment, FWH boot block 31 contains FWH_A code that is provided within the FWH at production. This may be a single 64 KB block that is protected by hardware, and cannot be updated by the system. This code locates BIOS_A, and performs a validation procedure to verify that the BIOS code is the code that is expected.

BIOS startup block 32 provides code that executes within FWH_A but is typically provided by the BIOS vendor. It can include code for interfacing with BIOS_A, BIOS_B, and also for a BIOS recovery function (not shown). Both boot block 31 and BIOS startup block 32 contain code that only executes directly from FWH 12.

Lock-down partition 33 is a set of one or more blocks that are locked down early in the boot process so they will be protected during system operation. Each block can be locked down individually. A Flash Media Manager (FMM) can be used to update data within this partition. However, any access that attempts to write to this partition must do so during the boot sequence before lockdown. Once the blocks in this partition have been locked down, the FWH hardware prevents any writes to these memory locations. These blocks can be unlocked only by resetting the FWH, and this occurs only during a CPU reset. To update these blocks, an update image is placed in memory and a CPU reset is initiated. During the protected boot sequence, this image will be detected and the update image will be used to update records within the locked down partition before it has actually been locked down.

Unlocked partition 34 is a set of one or more blocks that can be unlocked and are therefore accessible for writing. These blocks can be of any size that space allows. All data within these blocks can be managed by the FMM.

The number of blocks allocated to each of the functions shown in FIG. 2 can be selected to meet the needs of a particular system type, and would normally be determined by the BIOS vendor during initial design of the FWH and BIOS code.

A more detailed description of one embodiment of the invention follows, describing the four major sections of FIG. 1: FWH_A, BIOS_A, FWH_B, and BIOS_B.

FWH_A

FWH_A code is the system-critical startup code. It is the most trusted piece of code, and is assumed to be completely trustworthy (i.e., not subject to tampering or unauthorized changes). This code is hardware protected and is typically not programmable in the system. To increase the level of security, the system may use special hardware to protect this code. The device containing this code is generally built into the system's motherboard, and the code is responsible for validating the integrity of the next lower level of code. FWH_A code controls the security of all code within the bootstrap sequence, and may lockdown or otherwise protect any lower level code if tampering is detected. Such lockdowns may include, but are not limited to, hardware block locking.

The FWH_A code is the code responsible for performing a processor mode switch and validating the code within the system. In particular, it must validate the entire BIOS Startup Block before passing control over to the code. Verification can be done through the use of a checksum or through more complicated verification means. All code within this section of code should run with limited or no memory resources.

When an update recovery block (reclaim block) is available, the other security software can back up the BIOS startup block before erasing that block and then writing the new BIOS startup block during the update sequence. If power should be lost before the update can complete, the backup is used for updating. The FWH_A code determines which block, the BIOS startup block or the reclaim block contains the valid image.

The FWH_A can be the first piece of code executed after a processor reset. This code should execute without having to first initialize RAM resources. It is provided in the FWH boot block, which contains trusted code. FWH_A code can perform the following functions:

1) Boot vector—On processor reset, the first instruction is fetched at this location and executed.

2) Lock boot block—The boot block is set to a locked-down state. Execution of the lockdown code takes place external to the boot block, since flash memory cannot be locked down while executing code from within itself.

3) Switch modes—Switch CPU mode to a flat 32-bit environment.

4) Validate BIOS startup block—perform validation through predetermined means, such as a checksum.

5) If validation fails—Either a) issue warning signal and halt system, or b) locate backup BIOS startup block in reclaim block, validate it, and jump to it if it passes or issue warning signal and halt system if it fails.

6) Jump to BIOS_A—If validation step 4 passed, jump to BIOS_A code entry point.

BIOS_A

BIOS_A code is generally responsible for system initialization, such as initializing main memory and enabling basic hardware resources. Like FWH_A code, BIOS_A code is typically built into the system motherboard, but unlike FWH_A code, BIOS_A code is typically re-programmable in the system. BIOS_A code can also perform validation of other code modules as needed.

BIOS_A code is the first piece of BIOS code executed. This code is responsible for determining the type of system reset that initiated the boot, and controls the security of current and lower level modules. For example, in the case of a Warm Boot, Cold Boot, or Awake, this code will typically lock down all the devices holding the firmware modules. In the case of an Update Boot, this code will typically perform any firmware updates and then reboot.

BIOS_A code may use interfaces provided to it from the FWH_A module. It can perform validation of the next lower level module and then pass control to that module upon successful validation.

BIOS_A code is responsible for enabling RAM resources, and passing control back to FWH_B. BIOS_A code is located in the BIOS startup block and is called by FWH_A code. As previously stated, BIOS_A code can perform these functions:

1) Determine reboot—The processor can be reset for multiple reasons. These reasons include waking from a power-saving sleep state, partial reboot, warm reboot, cold boot, and others. The boot sequence may be somewhat altered depending on which type of reboot is being executed.

2) Enable memory—Once the type of reboot has been determined, the BIOS_A code can restore the memory controller state (warm boot, wakeup from sleep state), or reinitialize and test the memory (cold boot).

3) Setup FWH_B parameters—The BIOS_A code indicates the execution path to perform based on the type of boot. It can determine the location of other protective software (warm boot), or the location to load the other protective software (cold boot).

4) Jump to FWH_B—After enabling memory, the BIOS_A code can return control back to the FWH boot block by jumping to the entry point of FWH_B.

FWH_B

FWH_B code generally involves system-critical patches and Option ROMs, such as CPU micro code patches and in-system Video BIOS. FWH_B code is typically stored on the motherboard, and is not responsible for its own security, which is provided by a higher-level module such as BIOS_A.

FWH_B code is responsible for initializing any related protective software from other managed blocks, for updating any blocks that need to be updated during the boot sequence, locking down those blocks, and passing control to BIOS_B. For example, this code might perform the following functions:

1) Initialize non-volatile storage—This code determines the total flash memory on the platform and initializes any associated registers.

2) Branch, based on type of boot—Based on the type of boot determined in BIOS_A, the code can branch to one of the following step 3's: Load OS, Return to OS, or Update.

3) Load OS—BIOS_A code indicated that the BIOS is reloading. The interface for other associated protective software should be loaded at the location indicated by BIOS_A.

4) Initialize stack—Memory resources are available, therefore the stack should be initialized for use.

5) Load Flash Media Manager (FMM) to memory—The FMM should be copied from the boot block to a location in memory based on the load value specified by BIOS_A.

6) Perform Restore if Needed—At this point, memory resources are available, allowing restoration of a failed BIOS startup block update to occur. Calling the FMM's restore function can do this.

7) Lockdown BIOS startup block—BIOS startup block should be locked-down.

8) Initialize FMM—Initializes the FMM, both the locked and unlocked partition, and allows any power-loss recovery to be performed.

9) Load related protective software—Other protective code can be loaded at this point, using the interface loaded in step 3.

10) On failure jump to BIOS Recovery—In the event that the FMM locked partition fails to initialize or the related protective software is not located, control can be passed to BIOS Recovery code.

11) Lock down blocks—Lock down all blocks within the lock-down partition.

12) Jump to BIOS_B—Pass control to the BIOS_B loader within FWH.

3) Return to OS—BIOS_A code indicated that the BIOS is returning to the OS, such as from a sleep state.

4) Lock down blocks—Using no memory resources, all blocks within the locked-down partition and BIOS startup block are locked down.

5) Switch to Real Mode—Before turning on the BIOS image in shadowed memory, the processor is returned to Real Mode.

6) Jump to BIOS compatibility boot vector—Return control back to the BIOS image shadowed in memory.

3) Update—BIOS_A code indicated that an update to the locked down partition is occurring and that the trusted update application should be executed.

4) Initialize Stack—Locate and set up a stack location.

5) Validate related protective code—Any related protective code must be validated to assure that the security software is itself secure and valid.

6) Validate and load update application—The update application software is validated and loaded into memory.

7) Execute update application—Pass control to the update application. This application locates, checks, and loads the update images.

8) Perform cold boot—Initiate a full reboot.

BIOS_B

BIOS_B code generally involves the main BIOS, Option ROMs and operating system (OS) loader. Main BIOS is typically stored on the motherboard and is updateable. It provides all software interfaces and performs additional hardware detection and initialization. It can also be used to validate the integrity of the BIOS_B Option ROMs and OS loader, typically by using checksums. The BIOS_B Option ROMs are typically stored in daughter cards and manage the initialization of the add-in hardware devices. These Option ROMs have no internal provisions for security or understanding of the described higher layers. However, they may have their own proprietary update mechanisms.

The BIOS_B code is typically responsible for loading standard BIOS, and can therefore be referred to as a BIOS loader. The actual order of events is typically left to the BIOS vendor to determine, but can be the following steps:

1) Load BIOS to memory—Once loaded into memory, BIOS_B code can decompress the BIOS code.

2) Initialize video—Outputting video to the screen as soon as possible is usually desirable.

3) Perform a full memory test—Only a portion of low memory might be initialized during the BIOS_A portion of the boot flow. This step can test and initialize the remaining memory.

4) Initialize remainder of the system.

5) Relocate related protective code—This code is also typically located at the high end of memory, so this step moves it to just below the SMM code of the previous step. Related tables can be located elsewhere.

6) POST—Complete Power-On Self-Test.

Figure 3:
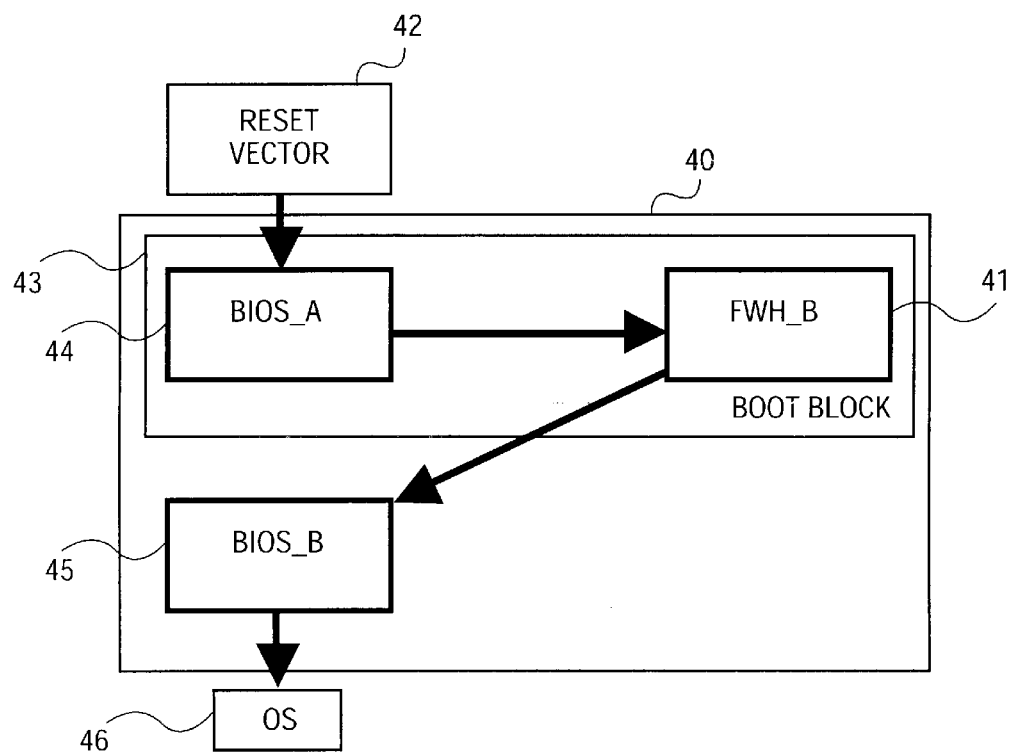
FIG. 3 shows a schematic of an alternate boot sequence.

In another embodiment, shown in FIG. 3, FWH boot block 43 contains BIOS_A code in sub-block 44 and FWH_B code in sub-block 41. BIOS_A code may be provided by the BIOS creator, while FWH_B code may be provided by the BIOS creator or by a third party. BIOS_A code and FWH_B are stored together in boot block 43 at the time of BIOS programming. BIOS_B code is stored in another portion of the nonvolatile device 40 and may not be protected. The code stored in boot block 43 may be protected from modification during runtime by hardware and can only be updated through BIOS_A code. Thus boot block 43 is protected from unauthorized tampering while the system is running.

The system's reset vector 42 causes execution to start at a predetermined address in BIOS_A. BIOS_A code is responsible for starting the system, initializing memory and locating FWH_B code. FWH_B code is responsible for locating and validating all or a portion of BIOS_B code to ensure it is the code that is expected. FWH_B code subsequently passes control to BIOS_B code, which continues the initialization of the system and loads operating system 46.

The foregoing description is intended to be illustrative and not limiting. Other variations will occur to those of skill in the art. Such variations are encompassed by the invention, which is limited only by the scope and spirit of the appended claims.

We claim:

1. A method of booting software in a computer system, comprising:
    initiating a reset function;
    executing a first protected program;
    validating a firmware-based BIOS program with code that cannot be updated by the computer system by verifying the BIOS program contains expected code;
    locking down portions of at least one of the first protected program and the BIOS program; and
    executing the BIOS program.

2. The method of claim 1, wherein said executing the BIOS program includes validating and executing an operating system loader.

3. The method of claim 1, wherein said validating includes locating the BIOS program.

4. The method of claim 1, wherein said initiating includes branching to an entry point of a boot sequence in the first protected program.

5. The method of claim 1, wherein said executing the BIOS program includes initializing a main memory.

6. The method of claim 1, wherein said executing the BIOS program includes determining a reset type.

7. The method of claim 1, wherein said validating the BIOS program includes validating and installing updated modules.

8. The method of claim 1, wherein said validating the BIOS program includes validating a second protected program, and executing the BIOS program includes executing the second protected program.

9. The method of claim 8, wherein the second protected program is an option ROM program.

10. A method of booting software in a computer system, comprising:
    initiating a reset function;
    executing a first protected program that cannot be updated by the computer system;
    validating, through said executing a first protected program, at least one of first and second firmware-based BIOS programs by verifying the at least one of the first and second BIOS programs contains expected code;
    executing the first BIOS program;
    executing a second protected program; and
    executing the second BIOS program, wherein at least one of said executing the first protected program and said executing the second protected program includes locking down blocks of data in at least one of said first protected program, said second protected program, said first BIOS program, and said second BIOS program.

11. The method of claim 10, wherein said initiating includes branching to an entry point of a boot sequence in the first protected program.

12. The method of claim 10, wherein said executing the first BIOS program includes initializing a main memory.

13. The method of claim 10, wherein said executing the first BIOS program includes determining a reset type.

14. The method of claim 10, wherein said executing the second protected program includes loading additional security elements into memory.

15. The method of claim 10, wherein at least one of said executing the first BIOS program and said executing the second BIOS program includes validating an operating system loader.

16. The method of claim 15, further comprising executing the operating system loader.

17. The method of claim 10, wherein said validating includes validating an option ROM.

18. The method of claim 17, wherein said executing at least one of the first and second BIOS programs includes executing a validated option ROM program.

19. The method of claim 10, wherein said validating includes validating and installing updated modules.

20. A machine-readable medium having stored thereon instructions, which when executed by at least one processor causes said at least one processor to perform the following:
    initiating a reset function;
    executing a protected program that cannot be updated by the at least one processor;
    validating, by said executing a protected program, a firmware-based BIOS program by verifying the BIOS program contains expected code;
    locking down portions of at least one of said protected program and said BIOS program; and
    executing the BIOS program.

21. The medium of claim 20, wherein said executing the BIOS program includes validating and executing an operating system loader.

22. The medium of claim 20, wherein said validating includes locating the BIOS program.

23. The medium of claim 20, wherein said initiating includes branching to an entry point of a boot sequence in the first protected program.

24. The medium of claim 20, wherein said validating the BIOS program includes validating a second protected program, and executing the BIOS program includes executing the second protected program.

25. The medium of claim 20, wherein said validating the BIOS program includes validating and installing updated modules.

26. An apparatus, comprising:
    a first firmware-based memory block containing a protected first program sequence; and
    a second firmware-based memory block containing a second program sequence for booting a computer system;
    wherein the first program sequence includes instructions for validating the second program sequence by verifying the second program sequence contains expected code and for transferring control to the second program sequence;
    wherein the protected first program sequence cannot be updated by the computer system;

wherein the first program sequence includes instructions for locking down at least one of a portion of the first memory block and a portion of the second memory block.

27. The apparatus of claim 26, wherein the second program sequences includes instructions for locking down at least one of a portion of the first memory block and a portion of the second memory block.

28. The apparatus of claim 26, wherein at least one of the first and second program sequences includes instructions for validating an option ROM.

29. The apparatus of claim 26, wherein at least one of the first and second program sequences includes instructions for validating and installing updated modules.

30. The apparatus of claim 26, wherein the first program sequence includes instructions for locating the second program sequence.

31. The apparatus of claim 26, wherein the second program sequence includes a BIOS program sequence.

\* \* \* \* \*